(12) United States Patent
Kase et al.

(10) Patent No.: US 8,051,754 B2
(45) Date of Patent: Nov. 8, 2011

(54) LATHE, COMPUTER PROGRAM FOR LATHE CONTROL, AND MACHINING METHOD BY LATHE

(75) Inventors: Yuji Kase, Niigata (JP); Kenji Okamura, Niigata (JP)

(73) Assignee: Tsugami Corporation, Tokyo (JP)

( * ) Notice: Subject to any disclaimer, the term of this patent is extended or adjusted under 35 U.S.C. 154(b) by 172 days.

(21) Appl. No.: 12/066,382

(22) PCT Filed: Jun. 12, 2007

(86) PCT No.: PCT/JP2007/061778
§ 371 (c)(1),
(2), (4) Date: Mar. 10, 2008

(87) PCT Pub. No.: WO2008/044366
PCT Pub. Date: Apr. 17, 2008

(65) Prior Publication Data
US 2010/0154605 A1    Jun. 24, 2010

(30) Foreign Application Priority Data
Oct. 6, 2006  (JP) .................................. 2006-274789

(51) Int. Cl.
*B23B 25/06*  (2006.01)
(52) U.S. Cl. .............................. 82/118; 82/1.11; 82/133
(58) Field of Classification Search .................... 82/1.11, 82/117, 118, 132, 133, 142, 134; 700/174
See application file for complete search history.

(56) References Cited

U.S. PATENT DOCUMENTS

| | | | | |
|---|---|---|---|---|
| 3,246,548 A | * | 4/1966 | Brouwer | 82/11.1 |
| 3,749,500 A | * | 7/1973 | Carlson et al. | 356/638 |
| 4,033,206 A | * | 7/1977 | Morita et al. | 82/118 |
| 4,195,250 A | * | 3/1980 | Yamamoto | 318/561 |
| 4,417,490 A | * | 11/1983 | Mochizuki | 82/118 |
| 4,562,392 A | * | 12/1985 | Davis et al. | 318/572 |
| 4,583,159 A | * | 4/1986 | Kanemoto et al. | 700/195 |
| 4,785,525 A | * | 11/1988 | Ishida et al. | 483/18 |
| 4,974,165 A | * | 11/1990 | Locke et al. | 700/193 |
| 5,214,829 A | * | 6/1993 | Minagawa | 29/27 C |
| 6,109,151 A | * | 8/2000 | Braun et al. | 82/48 |

FOREIGN PATENT DOCUMENTS

| | | |
|---|---|---|
| JP | 01-289606 A | 11/1989 |
| JP | 05-050361 A | 3/1993 |
| JP | 05050361 A * | 3/1993 |
| JP | 06039683 A * | 2/1994 |
| JP | 2000-033502 A | 2/2000 |

* cited by examiner

*Primary Examiner* — Boyer D Ashley
*Assistant Examiner* — Jennifer Swinney
(74) *Attorney, Agent, or Firm* — Kilpatrick Townsend & Stockton LLP

(57) ABSTRACT

With the use of a tool (41), first cutting is applied to a work (W), and then second cutting is applied to the work (W) while the tool (41) is transferred in an X-axis direction. Then, an amount of deviation dy between the cutting edge height of the tool (41) and the center line of the work (W) is calculated based on a first diameter value (D1) and second diameter value (D2) measured after the first cutting and second cutting are applied, and the travel distance of the tool (41) between the first cutting and the second cutting. Machining to the work (W) is resumed after the amount of deviation is corrected.

24 Claims, 12 Drawing Sheets

LATHE, COMPUTER PROGRAM FOR LATHE CONTROL, AND MACHINING METHOD BY LATHE

BACKGROUND OF THE INVENTION

1. Field of the Invention

The present invention relates to a lathe, a computer program for lathe control, and a machining method by a lathe.

2. Description of the Related Art

In machining a work by a lathe, the relative position of a tool to the work must be determined as accurately as possible. In order to carry out machining precisely and finely, it is important to set the relative cutting edge height of the tool to the work accurately. For example, in cutting a work into a tapered shape, the work might end up having an incomplete cutting end, as is often the case if the cutting edge height of the tool is not adapted to the work. If such an incomplete cutting end occurs, the position of the tool is adjusted and cutting is again applied so that the incomplete cutting end disappears. This is disadvantageous in terms of the number of machining steps required, etc.

As a technique conscious of cutting edge height adjustment, for example, the technique disclosed in Unexamined Japanese Patent Application KOKAI Publication No. 2000-33502 can be raised.

The device disclosed in the above-indicated patent literature has a positioning means which determines the relative vertical positions of a tool and a main spindle unit for holding and rotating a work.

The device of the above-indicated patent literature can set a ball screw, a slide, a motor, an NC unit, an encoder, a linear scale, etc. in place. Hence, this device can efficiently adjust the cutting edge height of a tool to match a work.

However, this device might get the cutting edge to deviate from the height set relative to the work, during machining the work. Nevertheless, this device is not taken any care of, about deviations that might arise correspondingly to the condition of machining.

SUMMARY OF THE INVENTION

The present invention was made in view of the above-described circumstance. An object of the present invention is to provide a lathe, a computer program for lathe control, and a machining method by a lathe, which can appropriately set the positional relationship between a tool and a work, in the flow of a machining process.

A lathe according to the present invention comprises: a main spindle (30) including a chuck for grasping a work (W); a tool post (40), to which a tool (41) for machining the work (W) by abutting on the work (W) is attached; a tool post drive unit which transfers the tool post (40) in an X-axis direction, which is a direction extending from the tool (41) to the work (W), and in a Y-axis direction different from the X-axis direction; a control unit which performs control to drive the tool post drive unit, such that the tool (41) is transferred in the X-axis direction and in the Y-axis direction; and an input unit for inputting a value of a diameter of the work (W) measured, wherein the control unit applies, via the tool post drive unit, first cutting to the work (W) and subsequently second cutting to the work (W) while transferring the tool (41) in the X-axis direction, calculates an amount of deviation, along the Y-axis direction, between a cutting edge height of the tool (41) and a center line of the work (W), based on a first diameter value of the work (W) after the first cutting is applied, a second diameter value of the work (W) after the second cutting is applied, and a travel distance of the tool (41) in the X-axis direction from when the first cutting is finished until when the second cutting is finished, the first and second diameter values and the travel distance being input from the input unit, and applies, via the tool post drive unit, third cutting to the work (W), after the amount of deviation is corrected.

The input unit may include: an input operation unit for inputting the diameter of the work (W) measured manually; and a feeding unit which feeds the first diameter value and the second diameter value input to the input operation unit to the control unit.

The input unit may include: a measuring unit which automatically measures the diameter of the work (W); and a feeding unit which feeds the first diameter value and the second diameter value measured by the measuring unit to the control unit.

The control unit may automatically apply the third cutting, after transferring the tool (41) via the tool post drive unit such that the cutting edge height of the tool (41) and the center line of the work (W) are in a predetermined positional relationship relative to each other.

The control unit may transfer the tool (41) such that the cutting edge height of the tool (41) and the center line of the work (W) are on a common plane.

The measuring unit may include a laser light emitting section capable of emitting laser light, a light receiving section capable of receiving passing light of the laser light that passes through the work (W), and a measuring section capable of measuring the first diameter value of the work (W) and the second diameter value of the work (W) from a sectional area of the laser light emitted from the laser light emitting section and a sectional area of the passing light received by the light receiving section.

A computer program for lathe control according to the present invention is a computer program for lathe control, for controlling a computer to control a lathe comprising: a main spindle (30) including a chuck for grasping a work (W); a tool post (40), to which a tool (41) for machining the work (W) by abutting on the work (W) is attached; a tool post drive unit which transfers the tool post (40) in an X-axis direction, which is a direction extending from the tool (41) to the work (W), and in a Y-axis direction different from the X-axis direction; a control unit which performs control to drive the tool post drive unit, such that the tool (41) is transferred in the X-axis direction and in the Y-axis direction; and an input unit for inputting a value of a diameter of the work (W) measured, wherein the computer program controls the control unit to perform: a former cutting process of applying, via the tool post drive unit, first cutting to the work (W) and subsequently second cutting to the work (W) while transferring the tool (41) in the X-axis direction; a calculation process of calculating an amount of deviation, along the Y-axis direction, between a cutting edge height of the tool (41) and a center line of the work (W), based on a first diameter value of the work (W) after the first cutting is applied, a second diameter value of the work (W) after the second cutting is applied, and a travel distance of the tool (41) in the X-axis direction from when the first cutting is finished until when the second cutting is finished, the first and second diameter values and the travel distance being input from the input unit, and a latter cutting process of applying, via the tool post drive unit, third cutting to the work (W), after the amount of deviation is corrected.

A machining method according to the present invention is a machining method by a lathe which cuts a work (W) by a tool (41), and comprises: a first cutting step of applying first cutting to the work (W) while transferring the tool (41) in an X-axis direction;

a first measuring step of measuring a first diameter value, which represents a diameter of the work (W) after the first cutting step: a second cutting step of applying second cutting to the work (W) while transferring the tool (41) in the X-axis direction after the first cutting step; a second measuring step of measuring a second diameter value, which represents a diameter of the work (W) after the second cutting step; a deviation amount calculating step of calculating an amount of deviation, along a Y-axis direction different from the X-axis direction, between a cutting edge height of the tool (41) and a center line of the work (W), based on the first diameter value, the second diameter value, and a travel distance of the tool (41) in the X-axis direction from when the first cutting step is finished until when the second cutting step is finished; and a third cutting step of applying third cutting to the work (W), after the amount of deviation is corrected.

The deviation amount calculating step may be performed manually.

The first measuring step and the second measuring step may emit laser light from a laser light emitting section to the work (W), receive passing light of the laser light that passes through the work (W) by a light receiving section, and measure the first diameter value of the work (W) and the second diameter value of the work (W) based on a sectional area of the laser light emitted from the laser light emitting section and a sectional area of the passing light received by the light receiving section.

The lathe according to the present invention calculates an amount of deviation based on the first diameter value and the second diameter value, which are actually measured values. Therefore, the real state of deviation can accurately be ascertained. The cutting edge height of the tool can thus be appropriately set. Hence, the positional relationship between the tool and the work can appropriately be set in the flow of the machining process. This makes it possible to cure a deviation corresponding to the condition of machining.

Further, the lathe according to the present invention more remarkably can apply accurate machining to a work, if the work has a relatively small diameter. The reason is as follows. If the work has a relatively small diameter, the amount of machining required is small. Therefore, the existence of only a small amount of cutting edge height deviation would greatly influence accurate and precise machining. However, the present invention can deal with a deviation corresponding to the condition of machining. Accordingly, the deviation can be corrected correspondingly to the condition of machining even if the amount of machining is small, and the work can therefore be machined appropriately.

BRIEF DESCRIPTION OF THE DRAWINGS

These objects and other objects and advantages of the present invention will become more apparent upon reading of the following detailed description and the accompanying drawings in which.

Figure 1:
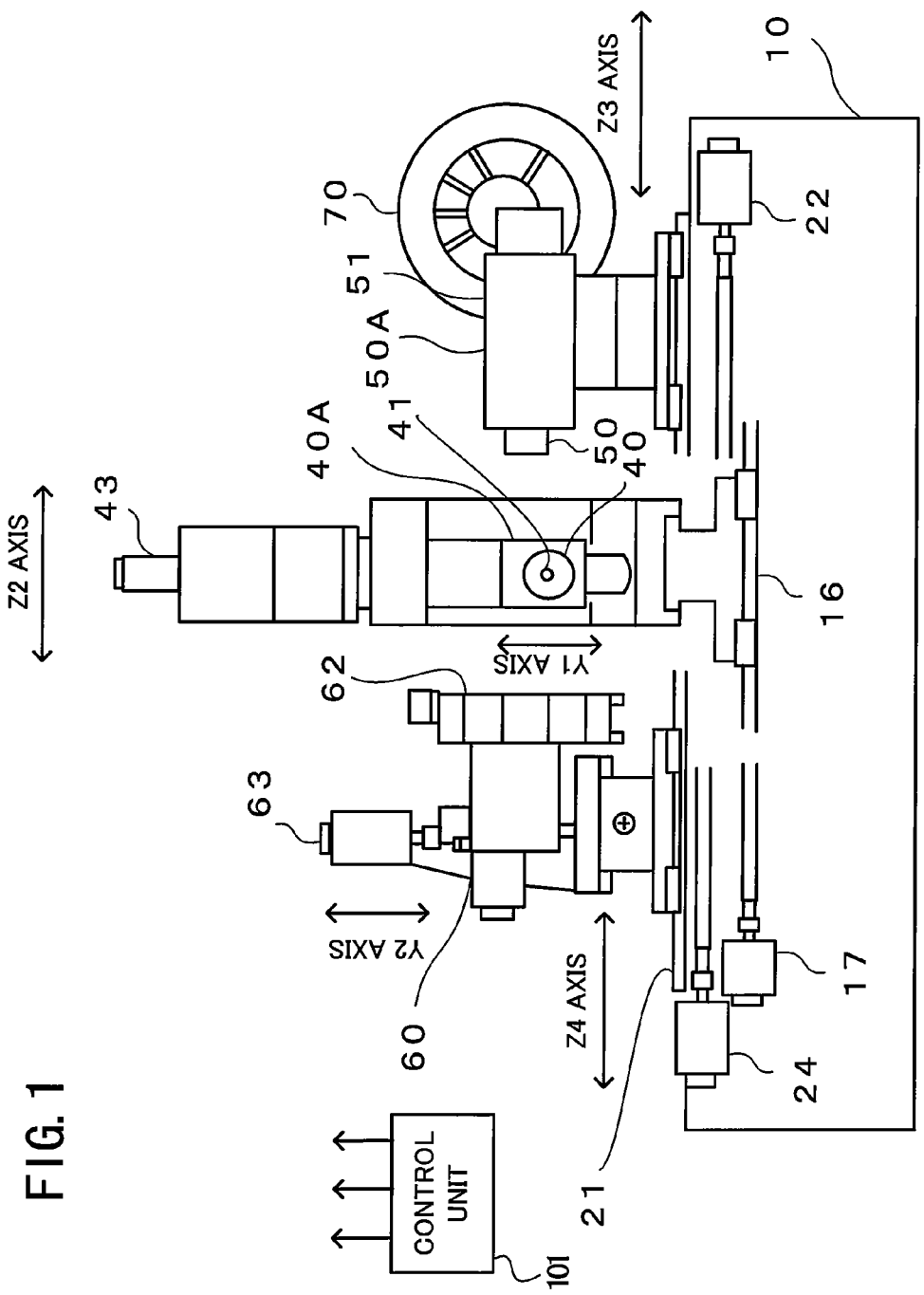
FIG. 1 is a front elevation of a lathe according to an embodiment of the present invention.

EXPLANATION OF REFERENCE NUMERAL 10 bed
11 rail
12 rail
13 Z1-axis motor
15 rail
16 rail
17 Z2-axis motor
18 X1-axis motor
20 rail
21 rail
22 Z3-axis motor
24 Z4-axis motor
25 X2-axis motor
30 main spindle
31 work rotating motor
40 tool post
41 tool
42 Y1-axis motor
43 direction changing motor
50 opposing main spindle
51 work rotating motor
61 tool
63 Y2-axis motor
101 control unit
201 work diameter measuring device

DETAILED DESCRIPTION OF THE PREFERRED EMBODIMENTS

Figure 2:
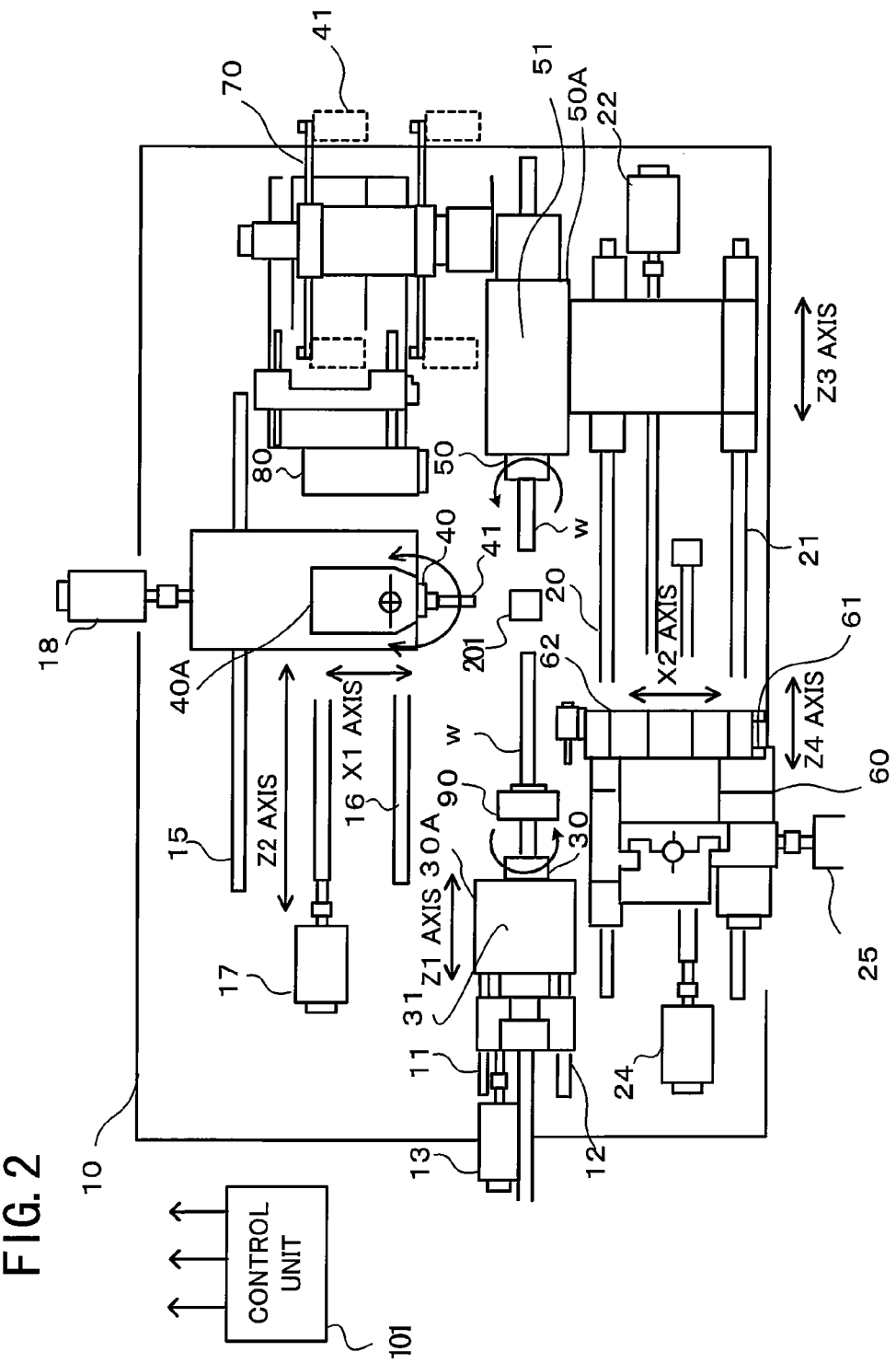
FIG. 2 is a plan view of the lathe according to the embodiment of the present invention.
Figure 3:
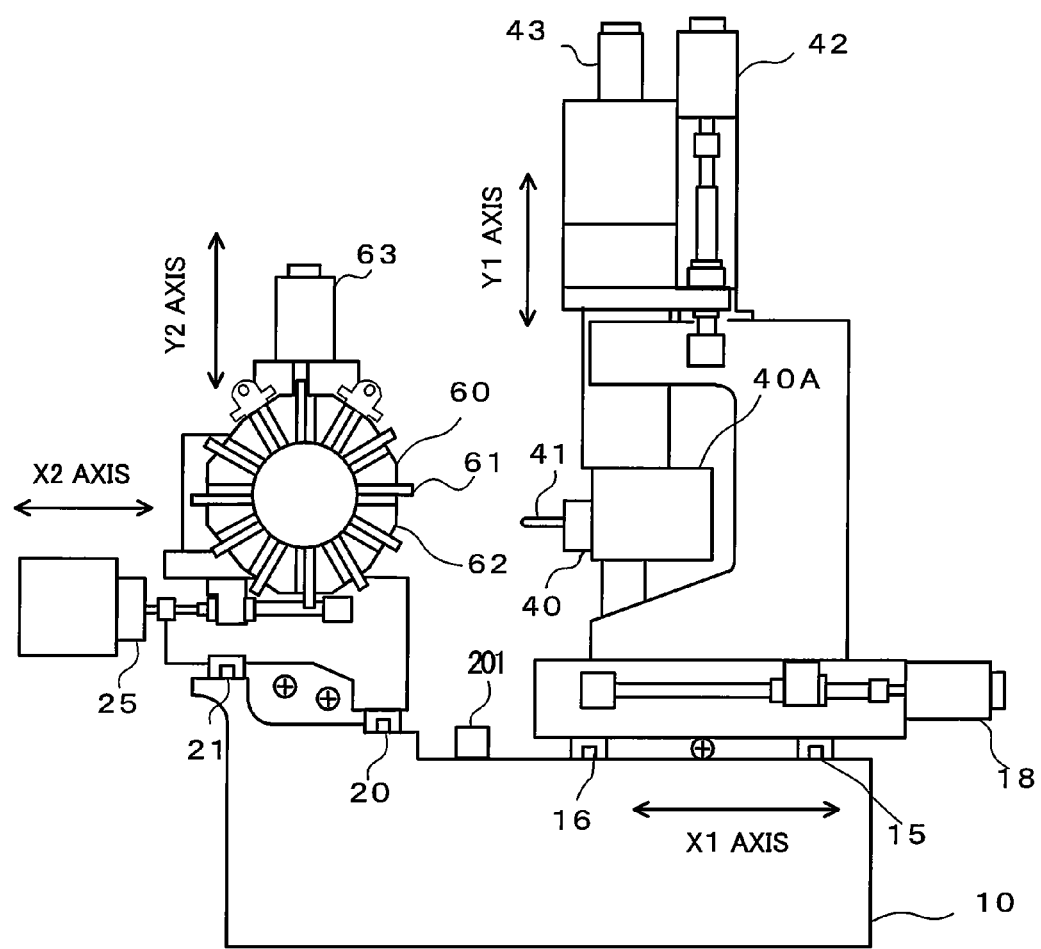
FIG. 3 is a diagram showing an example of the structure of a tool post and a turret tool post shown in FIG. 1.

A lathe according to an embodiment of the present invention will be explained below with reference to FIG. 1 to FIG. 3.

This lathe is a device that can apply complicated machining to a work W. As shown in FIG. 1 and FIG. 2, the lathe comprises a bed 10, a main spindle 30 for grasping the work W, a tool post 40, an opposing main spindle 50 for grasping a work W, a control unit 101, and a work diameter measuring device 201.

A spindle headstock 30A, which supports the main spindle 30, is mounted on two rails 11 and 12, which are laid on the bed 10 in parallel with a Z1-axis direction. By driving a Z1-axis motor 13, the spindle headstock 30A is moved in the Z1-axis direction. The spindle headstock 30A comprises a work rotating motor 31. The work rotating motor 31 rotates the work W grasped by a chuck attached to the main spindle 30.

Figure 4:
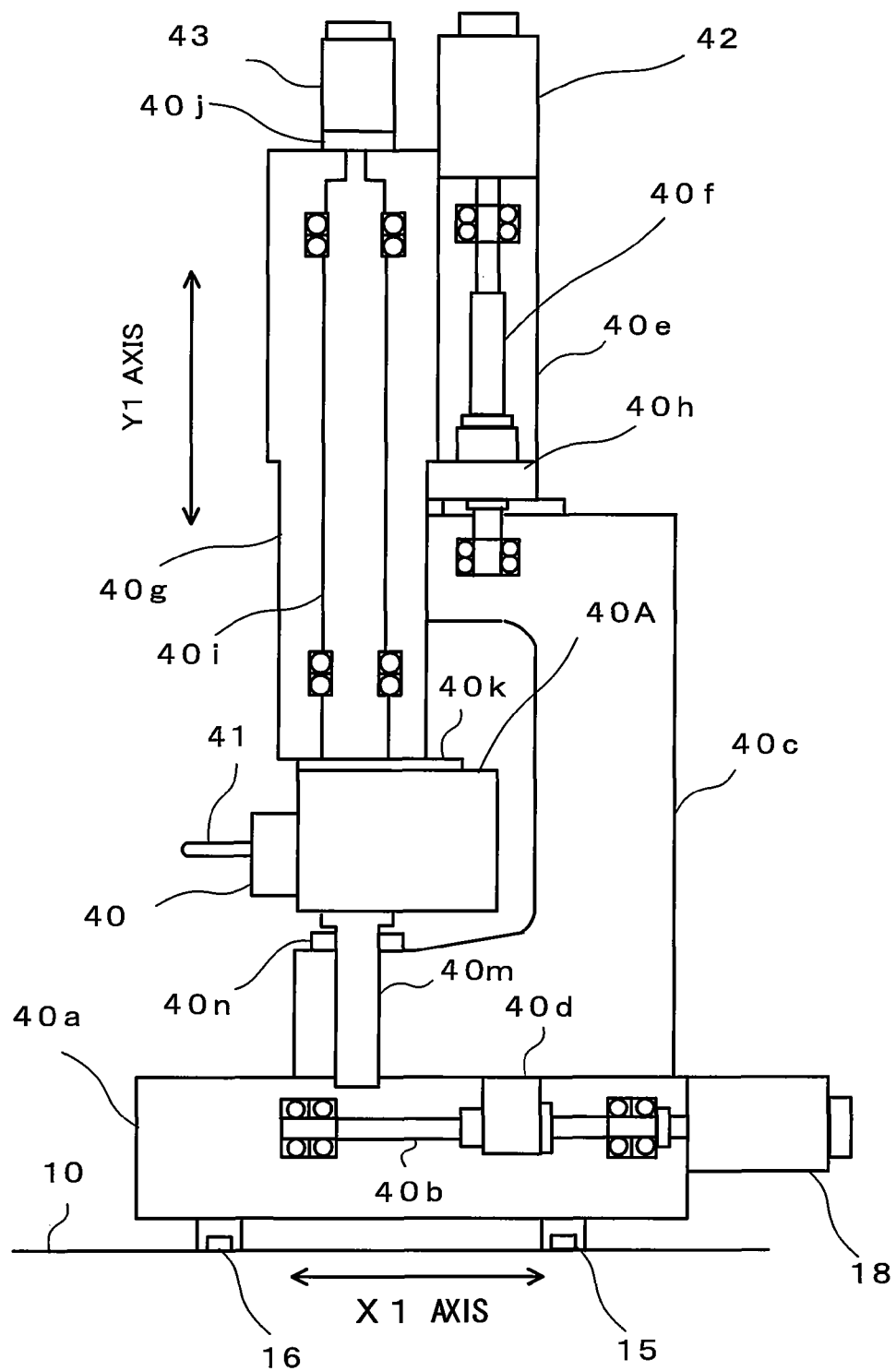
FIG. 4 is a diagram showing an overview of the mechanism for moving a tool post support of the lathe according to the embodiment of the present invention.

The tool post 40 rotatably grasps a tool 41 which is replaceable with another one. The tool post 40 is supported by a tool post support 40A. A mechanism for moving the tool post support 40A is shown in FIG. 4. Two rails 15 and 16 are laid on the bed 10 in a Z2-axis direction, which is parallel with the Z1-axis direction.

A base 40a is mounted on the rails 15 and 16. By driving a Z2-axis motor 17, the base 40a is moved in the Z2-axis direction.

A ball screw 40b is assembled into the base 40a in an X1-axis direction, which is perpendicular to the Z2-axis direction. An X1-axis motor 18, which moves the tool post support 40A in the X1-axis direction by rotating the ball screw 40b, is arranged at an end of the ball screw 40b.

A column 40c is arranged on the base 40a. A bracket 40d, which locks with the ball screw 40b, is attached to the bottom of the column 40c. When the X1-axis motor 18 is rotated, the column 40c moves in the X1-axis direction.

A motor bracket 40e, which supports a Y1-axis motor 42, is fixed at the top of the column 40c. The Y1-axis motor 42 rotates a ball screw 40f, which extends in a Y1-axis direction. The ball screw 40f locks with a bracket 40h, which extends from a housing 40g. When the Y1-axis motor 42 rotates, the ball screw 40f rotates and the housing 40g moves upward or downward.

A spindle 40i is incorporated in the housing 40g, in a manner that it can rotate therein. One end of the spindle 40i and a direction changing motor 43 are connected by a coupling 40j on the top of the housing 40g.

One end of the tool post support 40A is attached to the other end of the spindle 40i with an attachment plate 40k interposed. A shaft 40m is attached to the other end of the tool post support 40A that is opposite to the attachment plate 40k. The shaft 40m is rotatably supported by the column 40c with a holder 40n interposed.

By rotating the direction changing motor 43, the tool post support 40A is rotated together with the spindle 40i and the shaft 40m, and the tool 41 grasped by the tool post 40 changes its facing direction.

The opposing main spindle 50 grasps the work W, while facing the main spindle 30. The opposing main spindle 50 is supported by an opposing spindle headstock 50A. The opposing spindle headstock 50A is mounted on two rails 20 and 21, which are laid on the bed 10 in a Z3-axis direction parallel with the Z1-axis direction. By driving a Z3-axis motor 22, the opposing spindle headstock 50A is moved in the Z3-axis direction. A work rotating motor 51 is built in the opposing spindle headstock 50A. The work rotating motor 51 rotates the work W grasped by a chuck attached to the opposing main spindle 50. The main spindle 30 and the opposing main spindle 50 have a hole opened therein, through which the work W is passed.

The control unit 101 comprises a processor, a ROM (Read Only Memory) storing a program defining the procedures of a process performed by the processor, and a RAM (Random Access Memory) storing a program executed upon a user's input of a suitable value, etc., and necessary information, which are all unillustrated. The control unit 101 drives and controls each of the above-described structural elements, i.e., the Z1-axis motor 13 and the work rotating motor 31 for the main spindle 30, the Z3-axis motor 22 and the work rotating motor 51 for the opposing main spindle 50, and the Z2-axis motor 17, the X1-axis motor 18, and the Y1-axis motor 42 for the tool post support 40, and also a Z4-axis motor 24, a X2-axis motor 25, and a Y2-axis motor 63 for a turret tool post 60 to be described later. Hence, the relative positional relationship between the work W and the tool 41, or between the work W and a tool 61 can be appropriately set.

When the tool post 40 and the tool 41 attached thereon move in the X1-axis direction by the X1-axis motor 18, the RAM in the control unit 101 records the travel distance dt. As will be explained later, the travel distance dt is used for calculating an amount of cutting edge height deviation between the tool 41 and the work W.

In addition to the above-described control, the control unit 101 also performs control regarding a tool changing mechanism 80 described later. The control unit 101 also performs control regarding the work diameter measuring device 201 described later.

The work diameter measuring device 201 comprises a laser measuring device. The work diameter measuring device 201 automatically measures the diameter of the work W according to the control of the control unit 101. The automatic measurement of the diameter of the work W saves a human operator time and effort for the measurement. In FIG. 3, the work diameter measuring device 201 emits laser light upward in the diagram, from its laser light emitting section. An unillustrated light receiving section receives light that has passed through the work W. The diameter of the work W can be measured from the sectional area of the laser light emitted from the laser light emitting section and the sectional area of the passing light received by the light receiving section. By using laser light, it is possible to accurately measure the diameter of the work W. The value actually measured by the work diameter measuring device 201 is supplied to the control unit 101. The timing at which the work diameter measuring device 201 measures the diameter of the work W is determined by the control unit 101. The work diameter measuring device 201 may be another type of device that works on another principle than described above to receive passing light.

The lathe according to the embodiment of the present invention further comprises a turret tool post 60, a tool magazine 70, a tool changing mechanism 80, and a guide bush 90.

The turret tool post 60 is mounted on the rails 20 and 21. By driving the Z4-axis motor 24, the turret tool post 60 is moved in a Z4-axis direction parallel with the Z2-axis direction. An X2-axis motor 25, which moves the turret tool post 60 in an X2-axis direction parallel with the X1-axis direction, is attached at a side of the turret tool post 60.

The turret tool post 60 holds a plurality of tools 61 for machining the work W. The turret tool post 60 comprises a rotating body 62, as shown in FIG. 3. The tools 61 are set in the rotating body 62. Any of the tools 61 is selected according to the rotation angle of the rotating body 62. A Y2-axis motor 63, which changes the position of the turret tool post 60 in a Y2-axis direction (height direction) parallel with the Y1-axis direction, is attached on the top of the turret tool post 60.

The guide bush 90 is arranged at one side of the main spindle 30, that is closer to the opposing main spindle 50. The guide bush 90 supports the work W that gets out from the main spindle 30, in a manner that the work W can slide.

Figure 5:
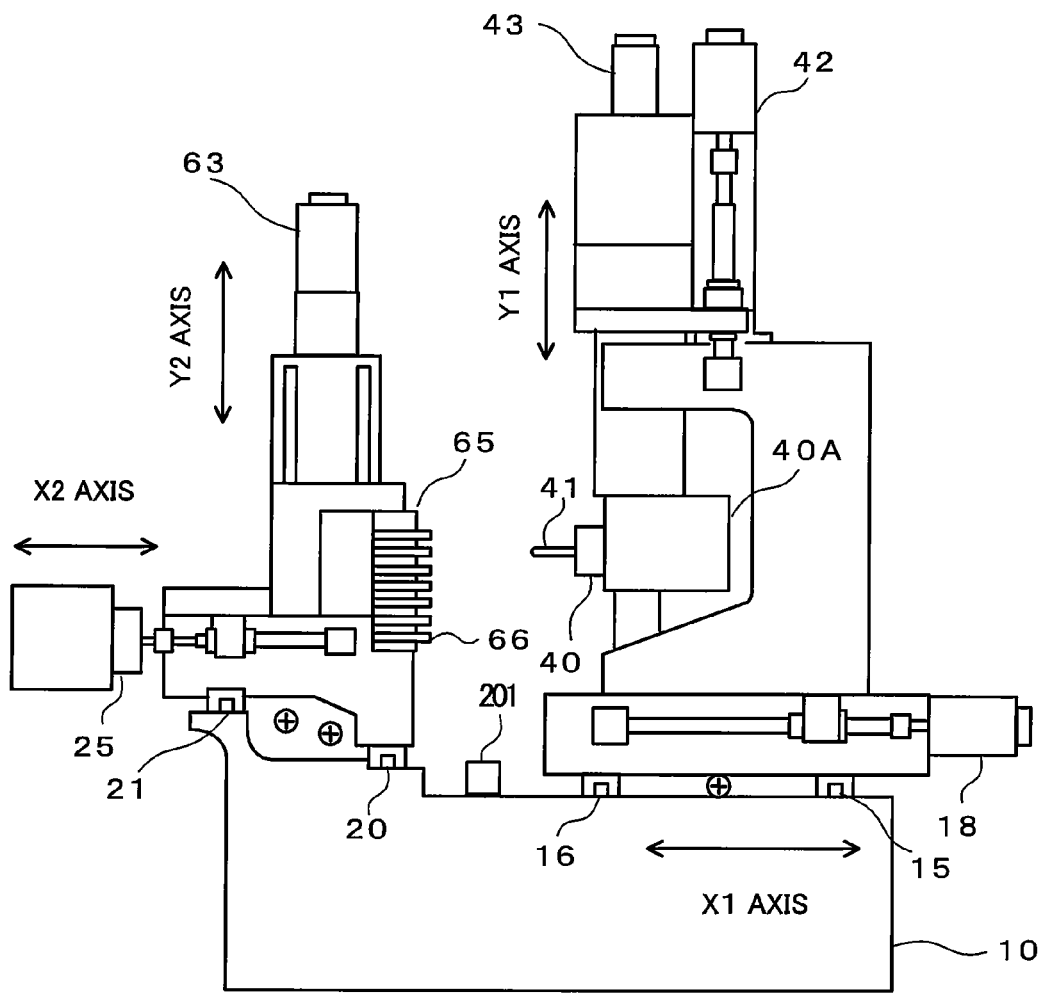
FIG. 5 is a diagram showing a modified example of the tool post of the lathe according to the embodiment of the present invention.

The turret tool post 60 is a turret-shaped one which comprises the rotating body 62. The turret tool post 60 is not limited to this. For example, the turret tool post 60 may be a gang tool post, on which a plurality of tools 66 are sequentially arranged as shown in FIG. 5.

The tool magazine 70 contains a required number of tools 41, which are to be attached to the tool post 40. The tool changing mechanism 80 is a mechanism for changing a tool 41 attached on the tool post 40 with a tool 41 contained in the tool magazine 70.

Next, the operation of the lathe according to the embodiment of the present invention will be explained. In the following explanation, transfer of the main spindle 30, measurement of a first diameter value D1 and a second diameter value D2, calculation of an amount of cutting edge height deviation dy, transfer of the tool 41 based on the value dy, etc., are all performed automatically, according to the program stored in the RAM of the control unit 101.

Figure 6:
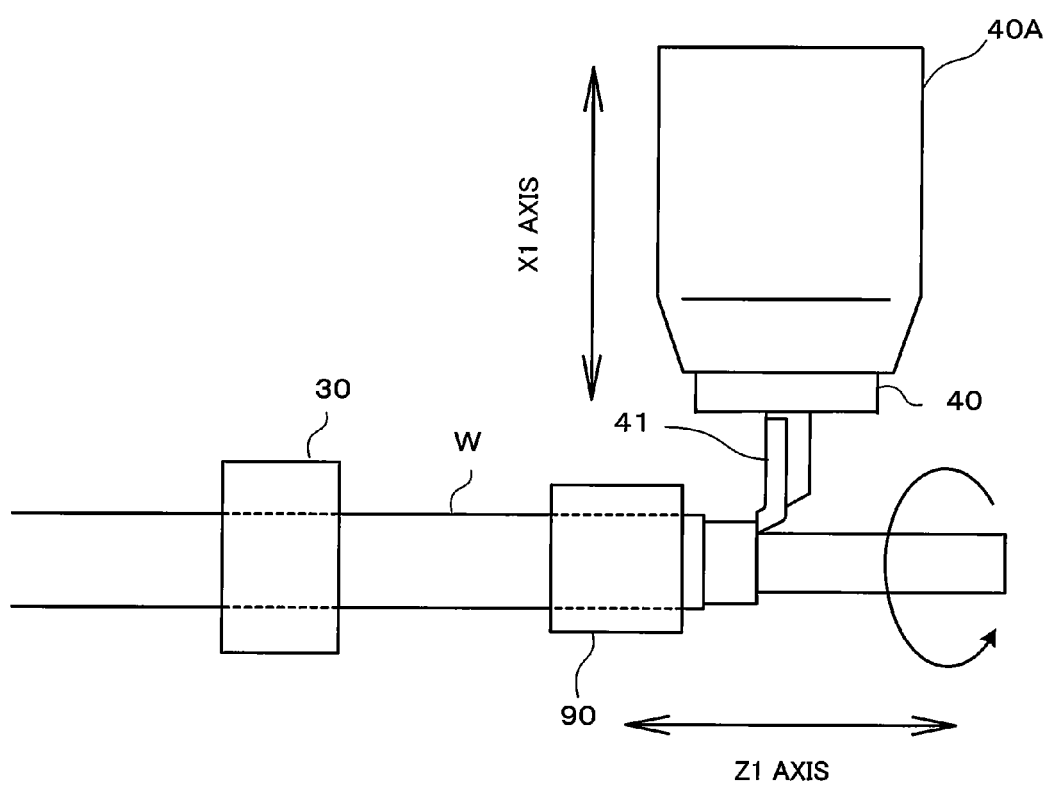
FIG. 6 is an explanatory diagram of an example of machining by the lathe according to the embodiment of the present invention.

FIG. 6 is an explanatory diagram of a machining example, in which outer-diameter machining is applied to the work W grasped by the main spindle 30. The work W is grasped by the chuck of the main spindle 30. By driving the Z1-axis motor 13 and the Z2-axis motor 17, the portion of the work W that is to be machined is positioned in front of the tool post 40. While the work W is rotated by driving the work rotating motor 31, the Z1-axis motor 13 and the X1-axis motor 18 are driven. This brings the tool 41 to abut on the work W, so the circumference of the work W grasped by the main spindle 30 is machined. By this machining, the circumference of the work W can be formed into a desired shape including a linear shape, a tapered shape, an arc shape, etc.

In the present embodiment, after machining of the work W is started, the amount of deviation between the cutting edge height of the tool 41 and the center line of the work W is checked during the machining. Then, after cutting edge height adjustment to correct the deviation is done, the machining is resumed. This adjustment will be explained below with reference to FIG. 7 and FIG. 8.

Figure 7:
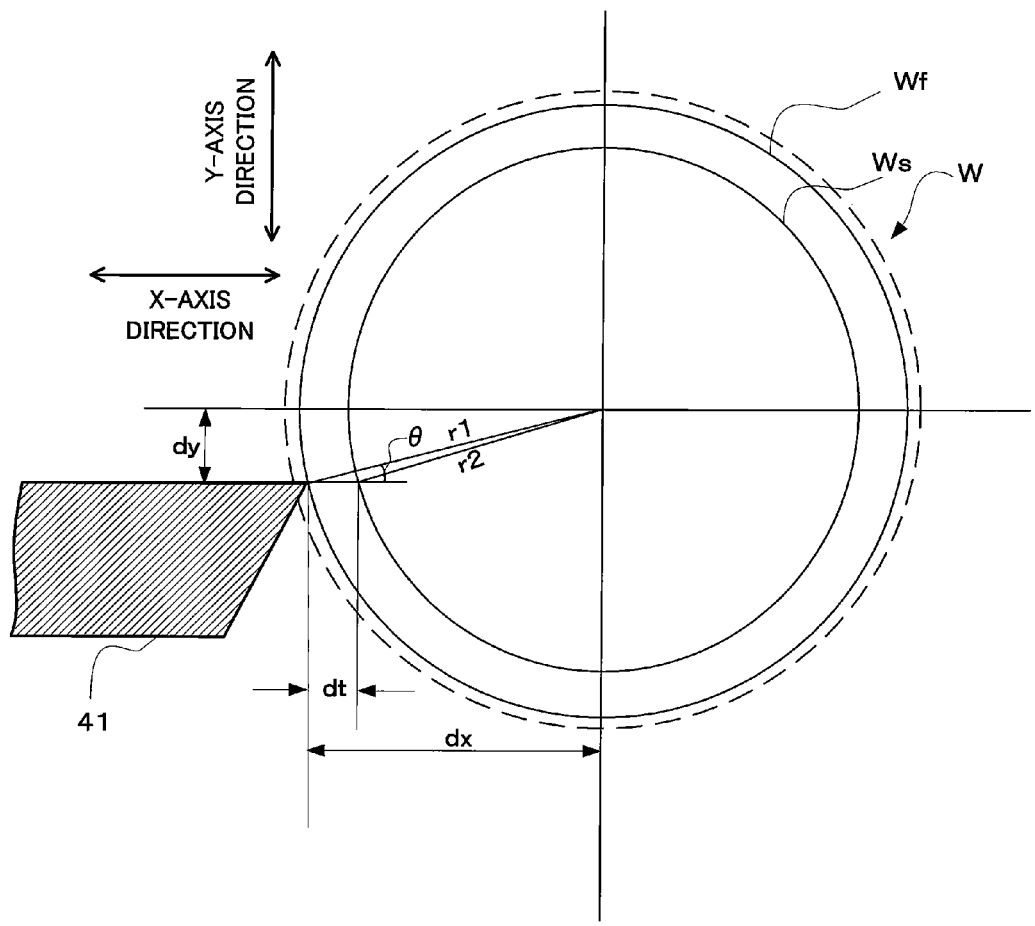
FIG. 7 is an explanatory diagram which explains a "deviation" produced between a tool and a work.

First, the tool 41 is moved frontward by a predetermined distance, by driving the X1-motor 18. Then, the work W is cut until the circumference of the work W reaches a line denoted by Wf, as shown in FIG. 7 (step S1 of FIG. 8). When this first cutting is completed, a first diameter value D1, which is the actual value of the diameter of the work Wf, is measured by the work diameter measuring device 201 (step S2 of FIG. 8). In FIG. 7, the work W before being machined is indicated by a broken line.

Figure 8:
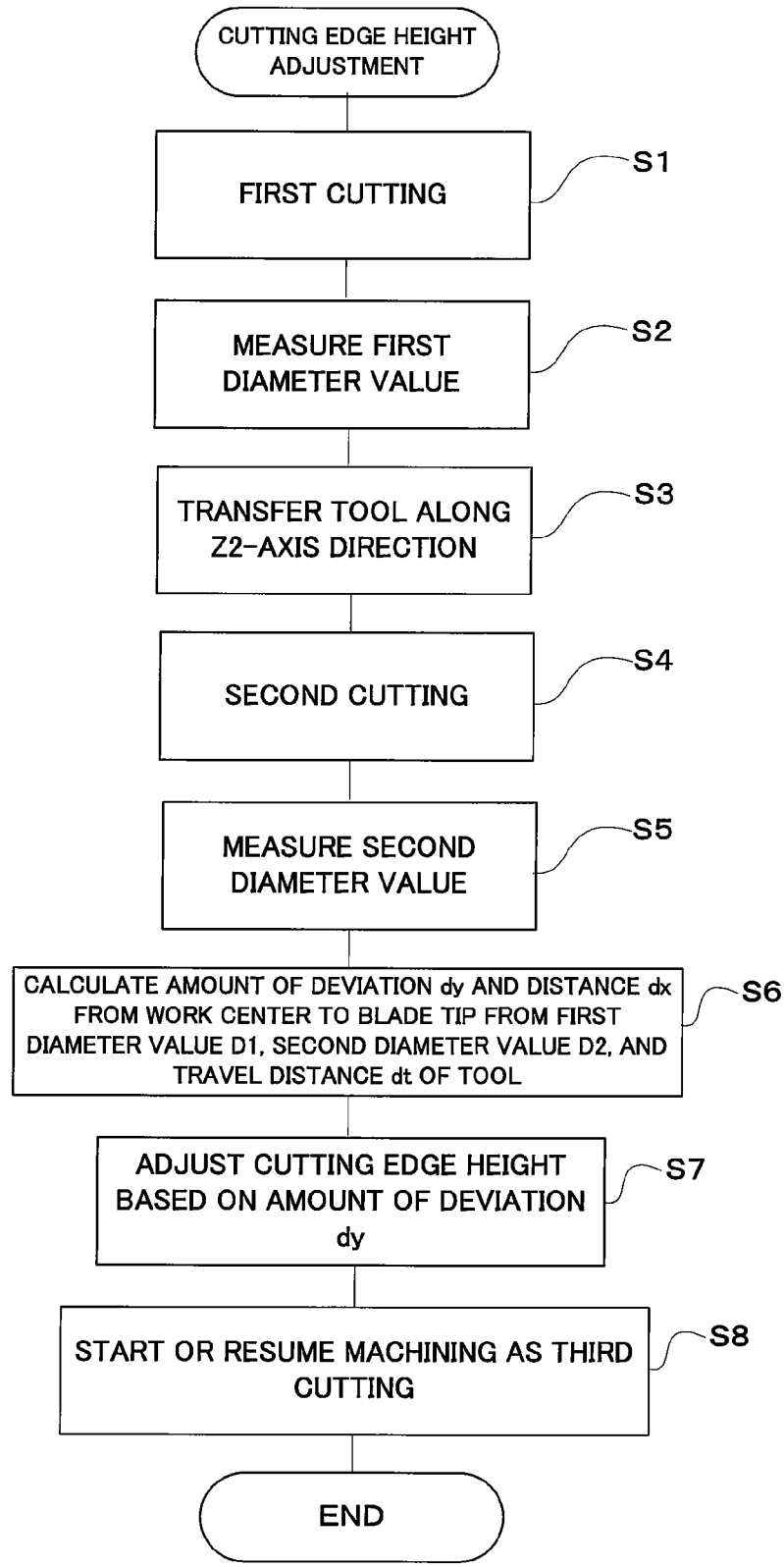
FIG. 8 is a flowchart showing the flow of cutting edge height adjustment to a tool based on an amount of deviation.
Figure 9:
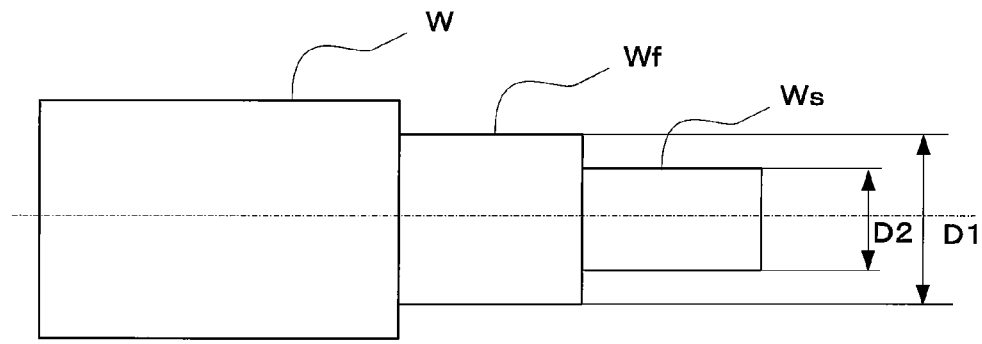
FIG. 9 is a diagram showing an example of the shape of the work after second cutting.

Then, by moving the tool post 40 in the Z2-axis direction or moving the main spindle 30 in the Z1-axis direction, the position at which the tool 41 faces the work W is changed (step S3 of FIG. 8). Then, cutting is applied until the circumference of the work Wf reaches a line denoted by Ws in FIG. 7 (step S4 of FIG. 8). When this second cutting is completed, a second diameter value D2, which is the actual value of the diameter of the work Ws, is measured by the work diameter measuring device 201 (step S5 of FIG. 8). FIG. 9 shows an example of the shape of the work W obtained after the first and second cutting.

In the above-described process, the first diameter value D1 and the second diameter value D2 are measured when the first cutting is completed and the second cutting is completed, respectively. In the example of the shape shown in FIG. 9, the first diameter value D1 and the second diameter value D2 may be measured simultaneously when the second cutting is completed.

The first diameter value D1 and second diameter value D2 obtained in this way, and the travel distance dt of the tool 41 in the X1-axis direction from when the first cutting is completed until when the second cutting is completed are stored in the RAM of the control unit 101.

Figure 10:
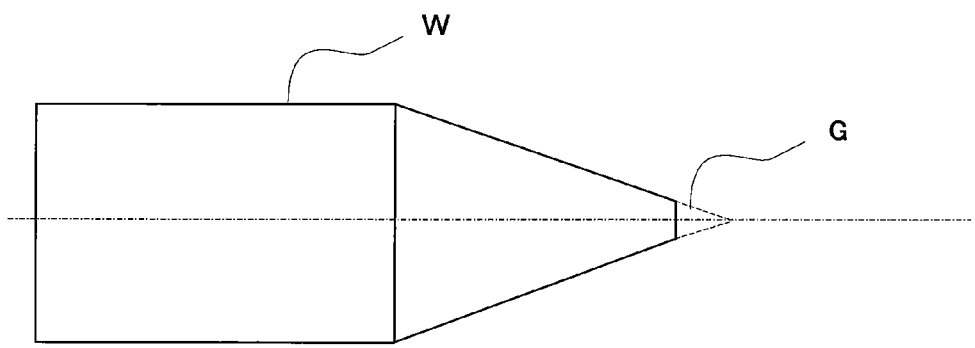
FIG. 10 is a diagram showing an example of the shape of an "incomplete cutting end", which occurs when the cutting edge height is not well adjusted.

Here, the values D1, D2, and dt have a relationship expressed by $$r2^2 = r1^2 + dt^2 - 2 \cdot r1 \cdot dt \cos\theta,$$ [Equation 1]

as derived from FIG. 7 and a known triangle formula. In the equation, r1 and r2 are respectively r1=D1/2, and r2=D2/2. The value θ represents an angle, which has a predetermined size when a "deviation" occurs between the cutting edge height of the tool 41 and the center line of the work W as shown in FIG. 7, i.e., when the cutting edge height of the tool 41 relative to the work W is not correct. For example, in cutting the leading end of the work W into a tapered shape, if a "deviation" occurs between the cutting edge height of the tool 41 and the center line of the work W, cutting the work W does not result in the obtained taper having a generatrix of a desired length. Or, it might result in producing an incomplete cutting end G, as shown in FIG. 10. The production of an incomplete cutting end G means that there has occurred a state of the leading end not being sharpened, against the requirement for a tapered shape.

Since the first diameter value D1 and second diameter value D2, and the travel distance dt of the tool have the relationship expressed by the above-given equation, it is possible to calculate cos θ, by transforming this equation into

[Equations 2]

$$\cos\theta = \frac{r1^2 + dt^2 - r2^2}{2 \cdot r1 \cdot dt} \quad (1)$$

An amount of cutting edge height deviation dy, and a distance dx between the center of the work and the tip of the blade can be calculated respectively as $$dy = r1 \cdot \sin\theta$$

$$dx = r1 \cdot \cos\theta$$

(step S6 of FIG. 8).

Then, by driving the Y1-axis motor 42 by a distance equivalent to the obtained value dy, the tool 41 is moved in the Y1-axis direction (step S7 of FIG. 8). This enables the cutting edge height of the tool 41 to be adjusted accurately relative to the work W. The correction of the deviation in machining the work W is done by moving the tool 41 such that the cutting edge height of the tool 41 and the center line of the work W are on a common horizontal plane. It is possible to easily correct the deviation by moving the tool 41 in this manner. Though having said this, it is also possible to correct the deviation in machining the work W, such that a predetermined offset is secured between the cutting edge height of the tool 41 and the center line of the work W.

When the cutting edge height adjustment is finished, the machining on the work W is resumed (step S8 of FIG. 8). This machining corresponds to the third cutting, as counted up from the first and second cutting described above. In the third cutting, by driving the Z1-axis motor 13 and the Z2-axis motor 17, the main spindle 30 grasping the work W is moved such that the portion of the work W that is to be machined is positioned in front of the tool post 40. While the work W is rotated by driving the work rotating motor 31, the Z1-axis motor 13 and the X1-axis motor 18 are driven. This advances the tool 41 forward to abut on the work W and machine the circumference of the work W grasped by the main spindle 30. When machining of the work W is finished, the X1-axis motor 18 is driven to retreat the tool post 40.

As explained above, according to the lathe of the present embodiment, an amount of cutting edge height deviation dy that reflects the actual state is calculated from the first diameter value D1 and second diameter value D2 which are actually measured, and the travel distance dt of the tool 41. Then, the machining is carried out after the amount of cutting edge height deviation dy is corrected. Accordingly, accurate and precise machining can be applied to the work W, with no production of an incomplete cutting end or the like.

Particularly, the lathe of the present embodiment achieves a remarkable effect in machining a work having a relatively small diameter. This is because, since a work having a relatively small diameter requires little machining, the existence of a small amount of cutting edge height deviation would cause a greater impact on accurate and precise machining. For example, in a case where the material diameter is 1 mm and the finishing diameter is 0.06 mm, if the cutting edge height of the tool is lower by 0.03 mm or more, machining with a finishing diameter of 0.06 mm is impossible. Even in such a case, the lathe of the present embodiment appropriately corrects the amount of cutting edge height deviation. Hence, the lathe can apply accurate and precise machining to the work.

In the correction of the amount of cutting edge height deviation according to the present embodiment, the amount of cutting edge height deviation dy is calculated from the equation (1) of [Equations 2] given above and dy=r1·sin θ. Then, by carrying out the second cutting explained with reference to FIG. 7 to a small extent, it is possible to set the cutting edge height appropriately. The first diameter value D1 and the second diameter value D2, from which the values r1 and r2 in the equation (1) of [Equations 2] given above are calculated, are obtained by actual measurement. To conduct actual measurement, it is preferred that the amount of the second cutting (and also the amount of the first cutting) should be as small as possible (to put it the other way around, it is preferred that the contour (Wf and Ws) of the work after the first cutting and the second cutting should be as large as possible).

In FIG. 7, in order that the relationship among r1, r2, and dt or dy may be clearly indicated, the size of the contour of the work W before being cut, and the size of the contour (Wf and Ws) of the work after the first cutting and the second cutting are shown more exaggeratedly than the actual. However, as obvious from the above discussion, these measures may be very small.

As described above, the lathe of the present embodiment shows a more remarkable effect in machining a work having a relatively small diameter.

Further, according to the present embodiment, the amount of deviation is calculated and cutting edge height adjustment is performed in the flow of the machining process. Therefore, the machining is not much disadvantaged in terms of the number of steps, etc. Further, by appropriately adopting cutting edge height adjustment in the flow of the machining process, is possible to achieve highly precise machining.

Further, according to the present embodiment, the flow of the series of steps from measurement of the first diameter value D1 and the second diameter value D2, to correction of the deviation between the cutting edge height of the tool 41 and the center line of the work W, and to resumption of machining is performed automatically. Hence, it is possible to improve the work efficiency.

Further, according to the present embodiment, particularly, such effects as follows can also be achieved. That is, first, the lathe according to the present embodiment comprises a mechanism for rotating the tool 41, which includes the opposing main spindle 50, the direction changing motor 43, etc. Therefore, after machining of the work W attached to the main spindle 30 is completed, it is possible to machine a work W grasped by the opposing main spindle 50 by rotating the tool on the tool post 40 by a desired angle, and driving the Z3-axis motor 22 and the Z2-axis motor 17.

At this time, cutting edge height adjustment can also be performed for the work W grasped by the opposing main spindle 50. That is, according to the present embodiment, it is possible to consecutively machine both the works W grasped by the main spindle 30 and the counteface main spindle 50 while making cutting edge height adjustment to both the works W, and hence with an outcome of both the works W being machined accurately.

Second, the lathe of the present embodiment comprises the guide bush 90. Therefore, even when machining a lengthy work W, the lathe can prevent occurrence of a deviation due to sag of the work W. This serves positively for the cutting edge height adjustment of the tool 41 to the work W. That is, since the work W does not easily sag, once the cutting edge height is accurately set to match one given portion of the work W, there is very little need of repeating cutting edge height adjustment for other portions lengthwise.

Figure 11:
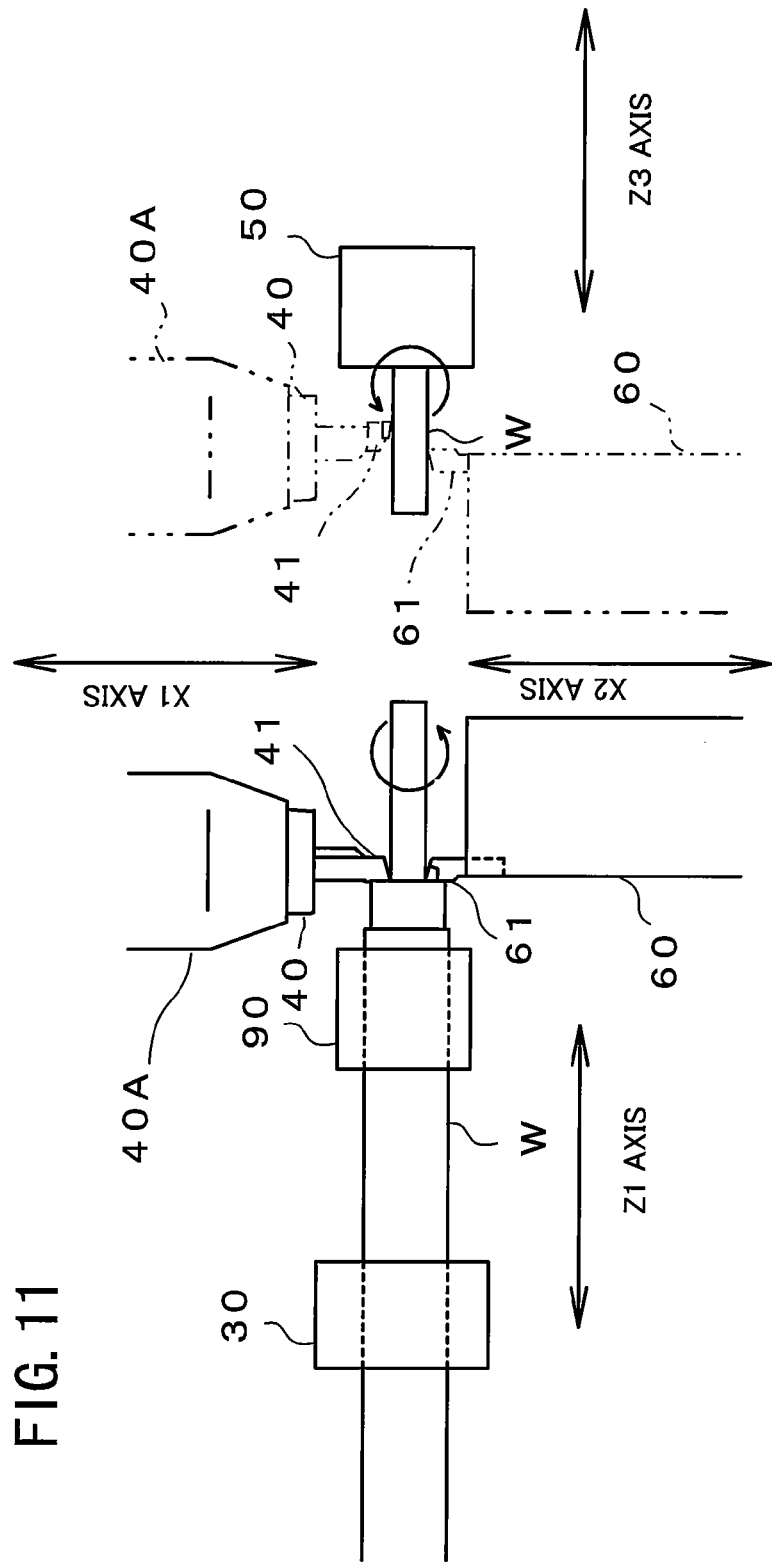
FIG. 11 an explanatory diagram of an example of machining by the lathe according to the embodiment of the present invention, which is different from the example of FIG. 6.

Third, the lathe of the present embodiment comprises the turret tool post 60, the X2-axis motor 25 for driving this, etc. Therefore, as shown in FIG. 11, by placing the tool 61 attached to the turret tool post 60 and the tool 41 attached to the tool post 40 to simultaneously abut on both the sides of the work W respectively, it is possible to machine both the sides in parallel.

At this time too, similar cutting edge height adjustment to that described above can be performed to the tool 61. In adjusting the cutting edge height of the tool 61, the travel distance of the tool 61 by the X2-axis motor 25 is used instead of the travel distance dt used in case of the tool 41. By making cutting edge height adjustment to both of the tool 41 and the tool. 61, it is possible to more accurately and precisely machine the work W.

Fourth, the lathe of the present embodiment comprises the tool magazine 70 and the tool changing mechanism 80. When any tool of any type is attached to the tool post 40 as necessity arises, similar cutting edge height adjustment to that described above can be performed to the tool.

The present invention is not limited to the above-described embodiment, but can be modified in various manners. Examples of modifications include the followings.

(1) In the above-described embodiment, the first diameter value D1 and the second diameter value D2 are measured automatically by the work diameter measuring device 201. These values may be measured manually.

Figure 12:
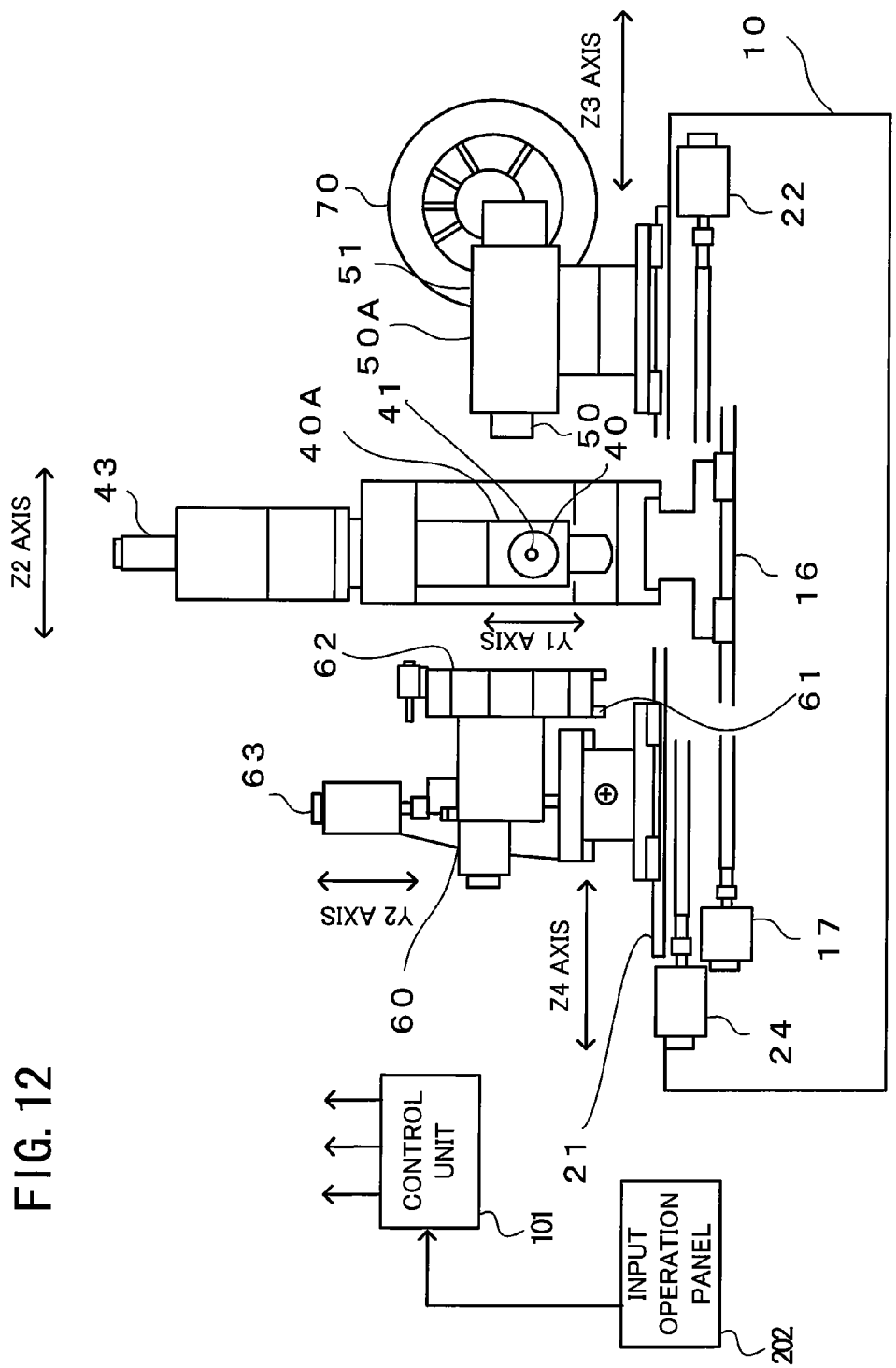
FIG. 12 is a front elevation of a lathe according to another embodiment of the present invention.
Figure 13:
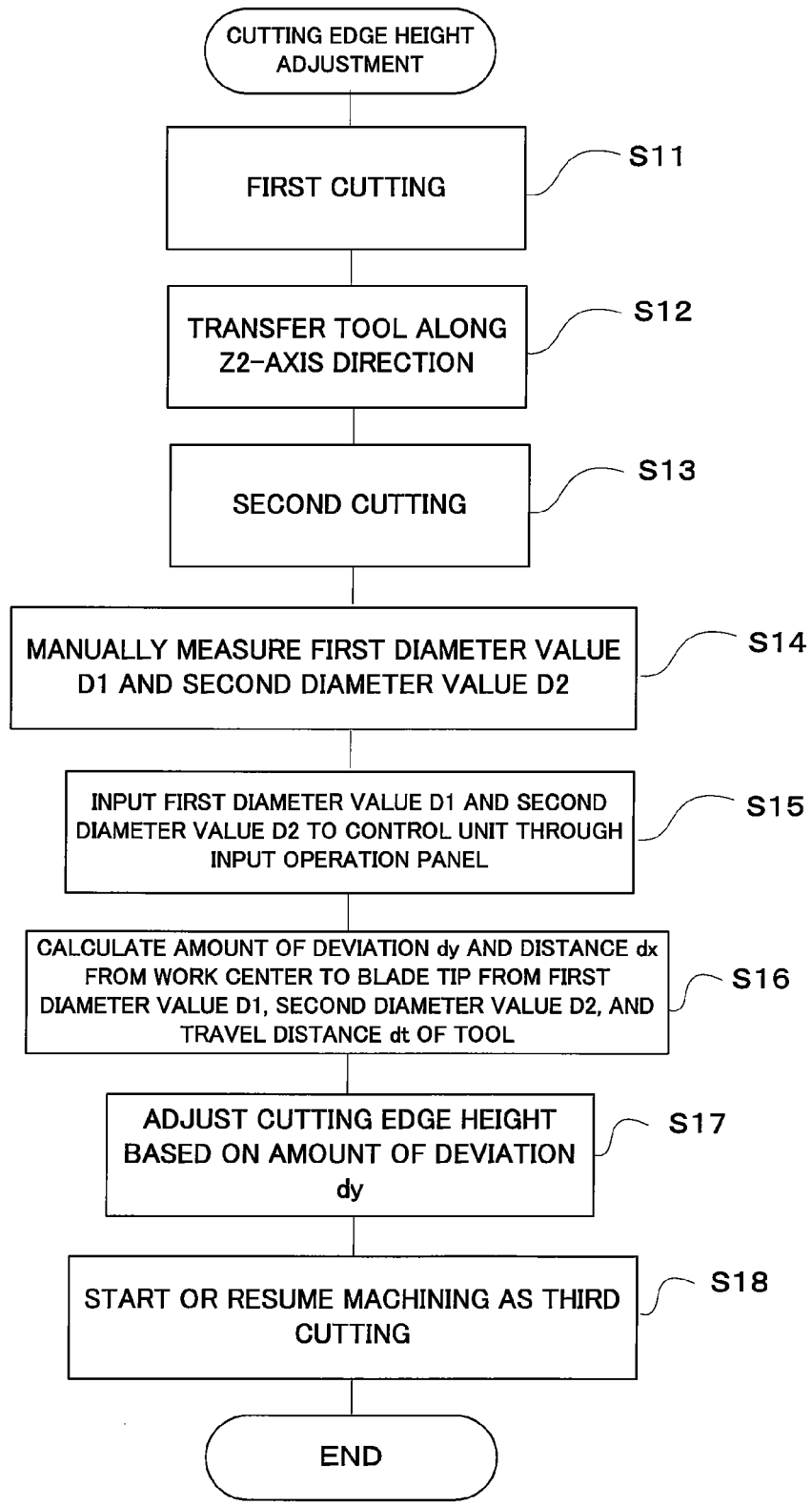
FIG. 13 is a flowchart showing the flow of cutting edge height adjustment to a tool, based on an amount of deviation, according to the another embodiment of the present invention.

In this case, as shown in FIG. 12, the lathe according to this embodiment comprises, for example, an input operation panel 202 for feeding the manually measured values D1 and D2 to the control unit 101. The lathe according to this embodiment performs cutting edge height adjustment shown in FIG. 13. In FIG. 13, the first cutting, the transfer of the tool 41 along the Z2-axis direction, and the second cutting are the same as those described with reference to FIG. 7 to FIG. 9 (step S11 to step S13 of FIG. 13). The first diameter value D1 and the second diameter value D2 are manually measured by, for example, a micrometer or a microscope (step S14 of FIG. 13). Then, the obtained values D1 and D2 are input to the control unit 101 through the input operation panel 202 (step S15 of FIG. 13). The control unit 101 calculates the amount of cutting edge height deviation dy from D1 and D2, and the travel distance dt of the tool 41 (step S16 of FIG. 13). Then, the tool 41 is moved, by automatically driving the Y1-axis motor 42 (step S17 of FIG. 13). Then, the machining is resumed (step S18 of FIG. 13).

In the foregoing, D1 and D2, which are the diameter values, are input through the input operation panel 202. However, D1/2 and D2/2, which are the radius values, may be input.

According to such a mode by manual measurement, the actual state of the work can be eye-observed and checked, and the succeeding machining can be performed accurately.

(2) Regardless of whether the first diameter value D1 and the second diameter value D2 are measured automatically or manually, the amount of cutting edge height deviation dy may be calculated from the obtained D1 and D2 and the travel distance dt of the tool 41, and the Y1-axis motor 42 may be driven manually not by the control unit 101 based on the amount dy, to transfer the tool 41.

The modes described in (1) and (2) above may be implemented based on the judgment of the human operator, in consideration of various practical factors such as the required machining precision, the actual state of the work W, etc. Anyway, by selecting a suitable method, it is possible to more favorably machine the work W.

According to the foregoing, the calculation of the amount of cutting edge height deviation dy based on D1, D2 and dt is done by the control unit 101. However, this calculation may be done manually by a calculator, table calculation, etc. In this case, the amount of cutting edge height deviation dy manually calculated is directly fed to the lathe through the input operation panel 202.

(3) In the above-described embodiment, the angle of deviation θ between the cutting edge height of the tool 41 and the center line of the work W is derived from the equation (1) of [Equations 2], and the amount of cutting edge height deviation dy is obtained from this angle θ, according to dy=r1·sin θ. Due to the "habits" or characteristics of the grasping system and rotating system for the work W provided on the main spindle 30, and various other factors, a unique "deviation" is produced between the tool 41 and the work W. Hence, as the case may be, the equation (1) of [Equations 2] or the equation dy=r1·sin θ may be appropriately modified in view of such a unique "deviation", and the amount of cutting edge height deviation may be calculated from the modified equation.

(4) In the above-described embodiment, the X1 and X2-axis directions, the Z1, Z2, Z3, and Z4-axis directions, and the Y1 and Y2-axis directions are perpendicular to one another. However, they may not be perpendicular, as long as they are oriented in different directions.

(5) In the above-described embodiment, the X1-axis direction and the X2-axis direction are parallel with each other and the Y1-axis direction and the Y2-axis direction are parallel with each other. However, they may not be parallel with each other. For example, the tool post 40 may be moved obliquely downward to advance the tool 41, and symmetrically the turret tool post 60 may be moved obliquely downward to advance the tool 61.

(6) Machining of the work W may be performed by moving the main spindle 30 or the opposing main spindle 50 while the position of the tool post 40 or the turret tool post 60 is fixed. Oppositely, machining may be performed by moving the tool post 40 or the turret tool post 60 while the position of the main spindle 30 or the opposing main spindle 50 is fixed.

(7) In the above-described embodiment, the guide bush 90 is provided. However, this may be omitted.

According to the above-described embodiment, after machining is started, the deviation between the cutting edge height of the tool and the center line of the work is corrected and then machining is resumed. However, first cutting and second cutting may be carried out on trial, and thereafter any deviation may be corrected and machining (non-preliminary machining) of the work may be started. The start of this non-preliminary machining is shown as the start of machining at step S8 of FIG. 8, and as the start of machining at step S18 of FIG. 13.

This application is based on Japanese Patent Application No. 2006-274789 filed on Oct. 6, 2006 and including specification, claims, drawings and summary. The disclosure of the above Japanese Patent Application is incorporated herein by reference in its entirety.

INDUSTRIAL APPLICABILITY

This invention is available for the lathe which applies accurate machining to a work. This invention is available for the machining method for accurate machining to a work.

What is claimed is:

1. A lathe, comprising:
   a main spindle (30) including a chuck for grasping a work (W);
   a tool post configured for a tool for machining said work by abutting on said work, to be attached to said tool post;
   a tool post drive unit which transfers said tool post (40) in an X-axis direction, which is a direction extending from said tool (41) to said work (W), and in a Y-axis direction different from said X-axis direction;
   a control unit which performs control to drive said tool post drive unit, such that said tool (41) is transferred in said X-axis direction and in said Y-axis direction; and
   an input unit for inputting a value of a diameter of said work (W) measured,
   wherein said control unit
   applies, via said tool post drive unit, first cutting to said work (W) and subsequently second cutting to said work (W) while transferring said tool (41), which is attached to said tool post (40), in said X-axis direction,
   calculates an amount of deviation, along said Y-axis direction, between a cutting edge height of said tool (41) and a center line of said work (W), based on a first diameter value of said work (W) after said first cutting is applied, a second diameter value of said work (W) after said second cutting is applied, and a travel distance of said tool (41) in said X-axis direction from when said first cutting is finished until when said second cutting is finished, wherein said first and second diameter values and said travel distance are input from said input unit, and
   applies, via said tool post drive unit, third cutting to said work (W), after said amount of deviation is corrected.

2. The lathe according to claim 1,
   wherein said input unit includes:
   an input operation unit for inputting the diameter of said work (W) measured manually; and
   a feeding unit which feeds said first diameter value and said second diameter value input to said input operation unit to said control unit.

3. The lathe according to claim 2,
   wherein said control unit automatically applies said third cutting, after transferring said tool (41) via said tool post drive unit such that the cutting edge height of said tool (41) and the center line of said work (W) are in a predetermined positional relationship relative to each other.

4. The lathe according to claim 3,
   wherein said control unit transfers said tool (41) such that the cutting edge height of said tool (41) and the center line of said work (W) are on a common plane.

5. The lathe according to claim 1,
   wherein said input unit includes:
   a measuring unit which automatically measures the diameter of said work (W); and a feeding unit which feeds said first diameter value and said second diameter value measured by said measuring unit to said control unit.

6. The lathe according to claim 5, wherein said control unit automatically applies said third cutting, after transferring said tool (41) via said tool post drive unit such that the cutting edge height of said tool (41) and the center line of said work (W) are in a predetermined positional relationship relative to each other.

7. The lathe according to claim 5, wherein said control unit transfers said tool (41) such that the cutting edge height of said tool (41) and the center line of said work (W) are on a common plane.

8. The lathe according to claim 3, wherein said measuring unit includes a laser light emitting section capable of emitting laser light, a light receiving section capable of receiving passing light of said laser light that passes through said work (W), and a measuring section capable of measuring said first diameter value of said work (W) and said second diameter value of said work (W) from a sectional area of said laser light emitted from said laser light emitting section and a sectional area of said passing light received by said light receiving section.

9. A program recording medium for use with a computer for executing instructions stored to said medium to perform a method, for controlling a lathe, the lathe being configured for cutting a work with a tool, the medium including instructions for the method comprising:
a first cutting process of controlling the lathe to apply first cutting to said work and subsequent second cutting to said work while transferring said tool in an X axis direction;
a calculation process of cutting of calculating an amount of deviation, along a Y-axis direction, different from said X-axis direction, between a cutting edge height of said tool and a center line of said work (W), based on a first diameter value of said work (W) after said first cutting is applied, a second diameter value of said work (W) after said second is applied, and a travel distance of said tool (41) in said X-axis direction from when said first cutting is finished until when said second cutting is finished; said first and second diameter values and said travel distance being input from an input unit of the lathe, and
a second cutting process of controlling the lathe to apply third cutting to said work, after said amount of deviation is corrected.

10. A machining method by a lathe which cuts a work (W) by a tool (41), comprising:
a first cutting step of applying first cutting to said work (W) while transferring said tool (41) in an X-axis direction;
a first measuring step of measuring a first diameter value, which represents a diameter of said work (W) after said first cutting step;
a second cutting step of applying second cutting to said work (W) while transferring said tool (41) in said X-axis direction after said first cutting step;
a second measuring step of measuring a second diameter value, which represents a diameter of said work (W) after said second cutting step;
a deviation amount calculating step of calculating an amount of deviation, along a Y-axis direction different from said X-axis direction, between a cutting edge height of said tool (41) and a center line of said work (W), based on said first diameter value, said second diameter value, and a travel distance of said tool (41) in said X-axis direction from when said first cutting step is finished until when said second cutting step is finished; and
a third cutting step of applying third cutting to said work (W), after said amount of deviation is corrected.

11. The machining method according to claim 10, wherein said deviation amount calculating step is performed manually.

12. The machining method according to claim 10, wherein said first measuring step and said second measuring step comprise emitting laser light from a laser light emitting section to said work (W), receiving passing light of said laser light that passes through said work (W) by a light receiving section, and measuring said first diameter value of said work (W) and said second diameter value of said work (W) based on a sectional area of said laser light emitted from said laser light emitting section and a sectional area of said passing light received by said light receiving section.

13. A lathe, comprising:
a main spindle (30) including a chuck for grasping a work (W) such that a center line of said work is in a Z-axis direction:
a tool post configured for a tool for machining said work by abutting on said work, to be attached to said tool post;
a tool post drive unit which transfers said tool post (40) in an X-axis direction, which is a direction extending from said tool (41) to said work (W) and is a direction different from said Z-axis direction, and in a Y-axis direction different from said X-axis direction and said Z-axis direction;
a control unit which performs control to drive said tool post drive unit, such that said tool (41) is transferred in said X-axis direction and in said Y-axis direction; and
an input unit for inputting a value of a diameter of said work (W) measured,
wherein said control unit
applies, via said tool post drive unit, first cutting to said work (W) and subsequently second cutting to said work (W) while transferring said tool (41), which is attached to said tool post (40), in said X-axis direction,
calculates, as an amount of deviation, a distance along said Y-axis direction between an X-Z reference plane on which said center line of work exists and an abutting part of said tool (41) abutting on said work (W), based on a trigonometric relationship between a first diameter value of said work (W) after said first cutting is applied, a second diameter value of said work (W) after said second cutting is applied, and an X travel distance of said tool (41) in said X-axis direction from when said first cutting is finished until when said second cutting is finished, wherein said first and second diameter values are input from said input unit, and said first and second diameter values and said X travel distance are input into an equation used for computing the trigonometric relationship;
applies, via said tool post drive unit, third cutting to said work (W), after said amount of deviation is corrected by transferring said tool post (40) via said tool post drive unit in said Y-axis direction.

14. The lathe according to claim 13, wherein said input unit includes:
an input operation unit for inputting the diameter of said work (W) measured manually; and a feeding unit which feeds said first diameter value and said second diameter value input to said input operation unit to said control unit.

15. The lathe according to claim 14,
wherein said control unit automatically applies said third cutting, after transferring said tool (41) via said tool post drive unit in said Y-axis direction such that said abutting part of said tool (41) and the center line of said work (W) are in a predetermined positional relationship relative to each other.

16. The lathe according to claim 15,
wherein said control unit transfers said tool (41) in said Y-axis direction such that said abutting part of said tool is on said X-Z reference plane.

17. The lathe according to claim 13,
wherein said input unit includes:
a measuring unit which automatically measures the diameter of said work (W); and
a feeding unit which feeds said first diameter value and said second diameter value measured by said measuring unit to said control unit.

18. The lathe according to claim 17,
wherein said control unit automatically applies said third cutting, after transferring said tool (41) via said tool post drive unit in said Y-axis direction such that said abutting part of said tool (41) and the center line of said work (W) are in a predetermined positional relationship relative to each other.

19. The lathe according to claim 18,
wherein said control unit transfers said tool (41) such that the cutting edge height of said tool (41) and the center line of said work (W) are on a common plane.

20. The lathe according to claim 17,
wherein said measuring unit includes a laser light emitting section capable of emitting laser light, a light receiving section capable of receiving passing light of said laser light that passes through said work (W), and a measuring section capable of measuring said first diameter value of said work (W) and said second diameter value of said work (W) from a sectional area of said laser light emitted from said laser light emitting section and a sectional area of said passing light received by said light receiving section.

21. A program recording medium for use with a computer for executing instructions stored to said medium to perform a method to control a lathe, comprising:
controlling the lathe to grasp a work such that a center line of the work is in a Z-axis direction;
controlling the lathe to machine said work by abutting a tool, which is attached to a tool post on said work;
controlling the lathe to transfer said tool post in an X-axis direction, which is a direction extending from said tool (41) to said work (W) and is a direction different from said Z-axis direction, and in a Y-axis direction different from said X-axis direction and said Z-axis direction;
controlling the lathe to drive a tool post drive unit, such that said tool is transferred in said X-axis direction and in said Y-axis direction;
accepting, as an input, a value of a diameter of said work measured;
controlling the lathe to apply, via said tool post drive unit, first cutting to said work (W) and subsequent second cutting to said work (W) while transferring said tool (41) in said X-axis direction;
calculating, as an amount of deviation, a distance in said Y-axis direction 18 between an X-Z reference plane on which said center line of said work (W) exists and an abutting part of said tool (41) abutting on said work (W), based on a trigonometric relationship between a first diameter value of said work (W) after said first cutting is applied, a second diameter value of said work (W) after said second cutting is applied, and an X travel distance of said tool (41) in said X-axis direction from when said first cutting is finished until when said second cutting is finished; and
controlling the lathe to apply, via said tool post drive unit, a third cutting to said work (W), after said amount of deviation is corrected by transferring said tool post (40) via said tool post drive unit in said Y-axis direction.

22. A machining method by a lathe which cuts a work (W) by a tool (41) such that a center line of said work is in a Z-axis direction, the method comprising
a first cutting step of applying first cutting to said work (W) by abutting said tool (41) on said work (W) while transferring said tool (41) in an X-axis direction which is different from said Z-axis direction;
a first measuring step of measuring a first diameter value, which represents a diameter of said work (W) after said first cutting step;
a second cutting step of applying second cutting to said work (W) by abutting said tool (41) on said work (W) while transferring said tool (41) in said X-axis direction after said first cutting step;
a second measuring step of measuring a second diameter value, which represents a diameter of said work (W) after said second cutting step;
a deviation amount calculating step of calculating, as an amount of deviation, a distance in said Y-axis direction between a an X-Z reference plane on which said center line of said work (W) exists and an abutting part of said tool abutting on said work (W), based on a trigonometric relationship between a first diameter value of said work (W) after said first cutting is applied, a second diameter value of said work (W) after said second cutting is applied, and an X travel distance of said tool (41) in said X-axis direction from when said first cutting step is finished until when said second cutting step is finished, wherein said first and second diameter values are input from said input unit and said first and second diameter values and said X travel distance are substituted into an equation used for computing said trigonometric relationship thus computed; and
a third cutting step of applying, via said tool post drive unit, third cutting to said work (W), after said amount of deviation is corrected by transferring said tool post (4) via said tool post drive unit in said Y-axis direction.

23. The machining method according to claim 22,
wherein said deviation amount calculating step is performed manually.

24. The machining method according to claim 22,
wherein said first measuring step and said second measuring step comprise emitting laser light from a laser light emitting section to said work (W), receiving passing light of said laser light that passes through said work (W) by a light receiving section, and measuring said first diameter value of said work (W) and said second diameter value of said work (W) based on a sectional area of said laser light emitted from said laser light emitting section and a sectional area of said passing light received by said light receiving section.

* * * * *